(12) United States Patent
Feliciano et al.

(10) Patent No.: US 12,722,302 B2
(45) Date of Patent: Sep. 1, 2026

(54) 2D LASH DESIGN REPRESENTATION SYSTEM

(71) Applicant: L'OREAL, Paris (FR)

(72) Inventors: Rafael Feliciano, New Providence, NJ (US); Gregoire Charraud, Jersey City, NJ (US); Charlotte Colbois, Paris (FR)

(73) Assignee: L'Oreal, Paris (FR)

(*) Notice: Subject to any disclaimer, the term of this patent is extended or adjusted under 35 U.S.C. 154(b) by 15 days.

(21) Appl. No.: 19/043,203

(22) Filed: Jan. 31, 2025

(65) Prior Publication Data

US 2026/0225246 A1 Aug. 6, 2026

(51) Int. Cl.
*B25J 9/16* (2006.01)

(52) U.S. Cl.
CPC ........... *B25J 9/1679* (2013.01); *B25J 9/1697* (2013.01)

(58) Field of Classification Search
CPC ....... B25J 9/1679; B25J 9/1697; B25J 9/1689
See application file for complete search history.

(56) References Cited

U.S. PATENT DOCUMENTS 11,787,071 B2 * 10/2023 Amundson ............ B25J 9/1697 700/245
12,548,272 B2 * 2/2026 Lotti ..................... G06T 19/006
2019/0314997 A1 * 10/2019 Amundson ............ A41D 13/11
2019/0335835 A1 * 11/2019 Harding ................. A41D 13/11

* cited by examiner

*Primary Examiner* — Wade Miles
*Assistant Examiner* — Mohammed Yousef Abuelhawa
(74) *Attorney, Agent, or Firm* — Christensen O'Connor Johnson Kindness PLLC

(57) ABSTRACT

A system for mapping a lash extension distribution curve for use by a micro-robot is disclosed herein. The system may include at least one micro-robot, at least one image sensor, and a computing device. The computing device may include at least one processor and a non-transitory computer-readable medium, the latter of which has computer-executable instructions stored thereon. In response to execution by the at least one processor, the computer-executable instructions may cause the computing device to perform actions that include: receiving an image of a subject's eye from the image sensor; identifying subject eye landmarks in the image; mapping a lash extension design to the image; determining the lash extension distribution curve; and transmitting the lash extension distribution curve to the micro-robot. In some embodiments, the computing device may further perform actions related to the generation of the lash extension design and lash extension distribution curve.

20 Claims, 10 Drawing Sheets

Lash Extension Distribution Curve (Open)

Lash Length

Distance from center corner pupil

404a

Lash Extension Design (Doll), Distribution Curve

2D LASH DESIGN REPRESENTATION SYSTEM

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

Disclosed herein is a system for controlling a micro-robot to apply an eyelash extension using a lash extension distribution curve. The system may include at least one micro-robot, at least one image sensor, and a computing device. The micro-robot may include a plurality of magnets and an applicator configured to hold at least one eyelash. The computing device may include at least one processor and a non-transitory computer-readable medium having computer-executable instructions stored thereon that, in response to execution by the at least one processor, cause the computing device to perform a series of actions. These actions may include receiving an image of an eye of a subject from the at least one image sensor; identifying a plurality of subject eye landmarks in the image; mapping a lash extension design to the image of the eye of the subject using the plurality of subject eye landmarks; determining the lash extension distribution curve based on the mapped lash extension design and transmitting the lash extension distribution curve to the at least one micro-robot.

In some embodiments, identifying the plurality of subject eye landmarks includes identifying a medial subject eye landmark and identifying a lateral subject eye landmark. Medial subject eye landmarks may include a caruncle, a medial canthus, or a start of a subject lash. Lateral subject eye landmarks may include a lateral canthus.

In some embodiments, the lash extension design includes a design lower boundary curve. Mapping the lash extension design to the image using the plurality of subject eye landmarks may include additional actions, including detecting a subject lower boundary curve along a base of an upper eye lid visible in the image between the medial subject eye landmark and the lateral subject eye landmark; and mapping the design lower boundary curve to the subject lower boundary curve.

In some embodiments, the lash extension design includes a design upper boundary curve. Mapping the design lower boundary curve to the subject lower boundary curve may also include adjusting the design upper boundary curve based on the mapping of the design lower boundary curve to the subject lower boundary curve.

In some embodiments, a distance between the design lower boundary curve and the design upper boundary curve defines the lash extension distribution curve. The lash extension distribution curve may define lash extension lengths along the design lower boundary curve. Transmitting the lash extension distribution curve to the micro-robot may cause the micro-robot to apply at least one eyelash to the subject according to the lash extension lengths.

In some embodiments, the design upper boundary curve includes length values for points along the design lower boundary curve or length values for segments along the design lower boundary curve.

In some embodiments, the computing device is further configured to perform actions comprising: receiving a lash extension design image; identifying a medial design eye landmark and a lateral design eye landmark in the lash extension design image; detecting a design lower boundary curve in the lash extension design image between the medial design eye landmark and the lateral design eye landmark; and detecting a design upper boundary curve in the lash extension design image.

In another aspect, disclosed herein is a method of controlling a micro-robot to apply an eyelash extension using a lash extension distribution curve. The method may include receiving, by a computing device from an image sensor, an image of an eye of a subject; identifying, by the computing device, a plurality of subject eye landmarks in the image; mapping, by the computing device, a lash extension design to the image using the plurality of subject eye landmarks; determining, by the computing device, the lash extension distribution curve based on the mapped lash extension design; and transmitting, by the computing device, the lash extension distribution curve to the micro-robot.

In some embodiments, identifying the plurality of subject eye landmarks includes identifying a medial subject eye landmark and identifying a lateral subject eye landmark. Medial subject eye landmarks may include a caruncle, a medial canthus, or a start of a subject lash. Lateral subject eye landmarks may include a lateral canthus.

In some embodiments, the lash extension design includes a design lower boundary curve. Mapping the lash extension design to the image using the plurality of subject eye landmarks may include additional actions, including detecting a subject lower boundary curve along a base of an upper eye lid visible in the image between the medial subject eye landmark and the lateral subject eye landmark; and mapping the design lower boundary curve to the subject lower boundary curve.

In some embodiments, the lash extension design includes a design upper boundary curve. Mapping the design lower boundary curve to the subject lower boundary curve may also include adjusting the design upper boundary curve based on the mapping of the design lower boundary curve to the subject lower boundary curve.

In some embodiments, a distance between the design lower boundary curve and the design upper boundary curve defines the lash extension distribution curve. The lash extension distribution curve may define lash extension lengths along the design lower boundary curve. Transmitting the lash extension distribution curve to the micro-robot may cause the micro-robot to apply at least one eyelash to the subject according to the lash extension lengths.

In some embodiments, the design upper boundary curve includes length values for points along the design lower boundary curve or length values for segments along the design lower boundary curve.

In some embodiments, the method may also include receiving, by the computing device, a lash extension design image; identifying, by the computing device, a medial design eye landmark and a lateral design eye landmark in the lash extension design image; detecting, by the computing device, a design lower boundary curve in the lash extension design image between the medial design eye landmark and the lateral design eye landmark; and detecting, by the computing device, a design upper boundary curve in the lash extension design image.

In another aspect, disclosed herein is a computing device for generating a lash extension distribution curve for use by a micro-robot. The computing device may include circuitry for receiving an image of an eye of a subject from an image sensor; circuitry for identifying a plurality of subject eye landmarks in the image; circuitry for mapping a lash extension design to the image using the plurality of subject eye landmarks; circuitry for determining the lash extension distribution curve based on the mapped lash extension design; circuitry for transmitting the lash extension distribution curve to at least one micro-robot.

In some embodiments, identifying the plurality of subject eye landmarks includes identifying a medial subject eye landmark and identifying a lateral subject eye landmark. Medial subject eye landmarks may include a caruncle, a medial canthus, or a start of a subject lash. Lateral subject eye landmarks may include a lateral canthus.

In some embodiments, the lash extension design includes a design lower boundary curve. Mapping the lash extension design to the image using the plurality of subject eye landmarks may include detecting a subject lower boundary curve along a base of an upper eye lid visible in the image between the medial subject eye landmark and the lateral subject eye landmark; and mapping the design lower boundary curve to the subject lower boundary curve.

In some embodiments, the lash extension design includes a design upper boundary curve. Mapping the design lower boundary curve to the subject lower boundary curve may include adjusting the design upper boundary curve based on the mapping of the design lower boundary curve to the subject lower boundary curve.

In some embodiments, a distance between the design lower boundary curve and the design upper boundary curve defines the lash extension distribution curve. The lash extension distribution curve may define lash extension lengths along the design lower boundary curve. Transmitting the lash extension distribution curve to the micro-robot may cause the micro-robot to apply at least one eyelash to the subject according to the lash extension lengths.

In some embodiments, the computing device may further include circuitry for receiving a lash extension design image; circuitry for identifying a medial design eye landmark and a lateral design eye landmark in the lash extension design image; circuitry for detecting a design lower boundary curve in the lash extension design image between the medial design eye landmark and the lateral design eye landmark; and circuitry for detecting a design upper boundary curve in the lash extension design image.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Recently, systems have been developed that allow for the automatic creation and application of eyelash extensions; however, these systems have difficulty recreating the "look" of a particular design (referred to herein as an "eyelash extension design" or "lash extension design"), when it is important to be able to superimpose such a design in a two-dimensional plane that may be easily understood by computer-aided systems.

Disclosed herein are systems, devices, and methods for controlling a micro-robot to apply an eyelash extension using a lash extension distribution curve, including at least one micro-robot, at least one image sensor, and a computing device. By using an image sensor associated with the computing device, the image sensor may capture an image of a subject's eye and transmit the image to the computing device. The computing device may then identify subject eye landmarks in the image and map the lash extension design to the image of the subject's eye using the identified subject eye landmarks. The computing device may then determine a lash extension distribution curve based on the mapped lash extension design and transmit the lash extension distribution curve to the micro-robot.

Figure 1:
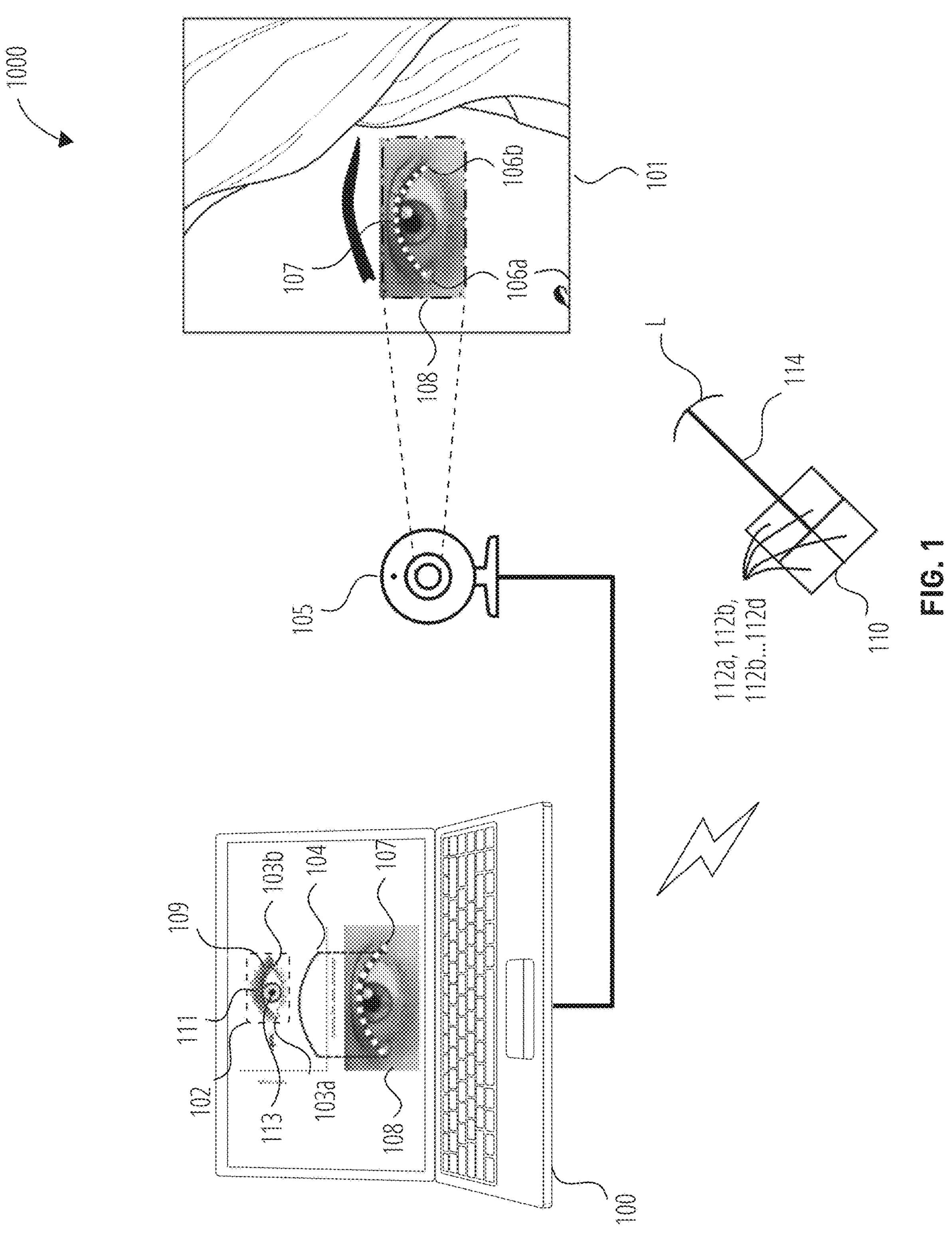
FIG. 1 is an illustration of a non-limiting example embodiment of a system for controlling a micro-robot to apply an eyelash extension using a lash extension distribution curve according to various aspects of the present disclosure

FIG. 1 is an illustration of a non-limiting example embodiment of a system for controlling a micro-robot to apply an eyelash extension using a lash extension distribution curve according to various aspects of the present disclosure. In some embodiments, system 1000 includes a computing device 100, an image sensor 105, and a micro-robot 110. In some embodiments, there may be more than one image sensor 105 (e.g., one for each of the user's 101 eyes) and more than one micro-robot 110 (see. FIG. 2A, FIG. 2B, FIG. 2C, and FIG. 2D). The image sensor 105 may be a camera or similar device and may be communicatively coupled with the computing device 100 or incorporated into the computing device 100. In some embodiments transmission between the computing device 100 and the image sensor 105 is accomplished through one or more wired communication technologies (including but not limited to Ethernet, FireWire, and USB), one or more wireless communication technologies (including but not limited to Wi-Fi, WiMAX, Bluetooth, 2G, 3G, 4G, 5G, and LTE), and/or combinations thereof. In some embodiments, micro-robot 110 may be comprised of a plurality of magnets 112*a*, 112*b*, 112*c* . . . 112*n* and an applicator 114 configured to hold at least one eyelash L. Non-limiting embodiments of the micro-robot 110 and details of their respective operations are described in FIG. 2A, FIG. 2B, FIG. 3A, and FIG. 3B. In some embodiments, the computing device 100 includes a processor and a non-transitory computer-readable medium upon which computer-executable instructions are stored. In some embodiments, computing device 100 may be a personal computer, laptop, tablet, smartphone, or a similar device. In response to these instructions, the processor may cause the computing device to perform a number of actions that result in the determination of a lash extension distribution curve 104 according to lash extension design 102 and an image 108 of the eye of the subject 101 by the image sensor 105.

In some embodiments, the computing device 100 is configured to generate a lash extension design 102 based upon the analysis of a lash extension design image 113. The computing device 100 may receive the lash extension design image 113. The lash extension design image 113 may include a two-dimensional rendering of an eyelash design, capturing the "look" of a particular design in relation to an exemplary eye. Non-limiting examples of a lash extension design image 113 may include an "Open" lash extension design image 413*a* (illustrated in FIG. 1 and FIG. 4A), a "Cat" lash extension design image 413*b* (illustrated in FIG. 4D), or a "Doll" lash extension design image 413*c* (illustrated in FIG. 4E). While illustrative embodiments are illustrated and described, it will be appreciated that myriad changes can be made to the lash extension design image 113 without departing from the spirit and scope of the invention.

The computing device 100 may be configured to identify design eye landmarks 103*a*, 103*b* in the lash extension design image 113. In some embodiments, this includes identifying at least one medial design eye landmark 103*a* and at least one lateral design eye landmark 103*b*. In some embodiments, the identified medial design eye landmark 103*a* may include a caruncle, a medial canthus, or a start of a subject lash. In some embodiments, the identified lateral design eye landmark 103*b* may include a lateral canthus.

The computing device 100 may be configured to detect a design lower boundary curve 109 in the lash extension design image 113. In some embodiments, the design lower boundary curve 109 is defined along the base of the upper eye lid of the lash extension design image 113 between the medial design eye landmark 103*a* and the lateral design eye landmark 103*b*, such that the curve follows the lower limit (attached "ends") of the individual lashes of the lash extension design image 113. The computing device 100 may also be configured to detect a design upper boundary curve 111 in the lash extension design image 113. In some embodiments, the design upper boundary curve 111 is defined such that the curve follows the upper limit (unattached "ends") of the individual lashes of the lash extension design image 113. In some embodiments, the design upper boundary curve 111 includes separate value lengths for every point of the design lower boundary curve 109, such that each individual lash of the lash extension design image 113 is associated with its own length value. In some embodiments, the design upper boundary curve 111 includes length values for segments of the design lower boundary curve, such that individual lashes of the lash extension design image 113 within a given segment are assigned the same length value. The resulting lash extension design 102 may include one or more of the following: the design eye landmarks 103*a*, 103*b*, the design lower boundary curve 109, and the design upper boundary curve 111.

In other embodiments, the lash extension design 102 is generated by another device, and the lash extension design 102 is transferred to the computing device 100.

The computing device 100 may be configured to receive the image 108 of the eye of the subject 101 from the image sensor 105. The computing device 100 may be further configured identify one or more subject eye landmarks 106*a*, 106*b* in the image 108. In some embodiments, this includes identifying at least one medial subject eye landmark 106*a* and at least one lateral subject eye landmark 106*b*. In some embodiments, the identified medial subject eye landmark 106*a* may include a caruncle, a medial canthus, or a start of a subject lash. In some embodiments, the identified medial subject eye landmark 106*a* may include a lateral canthus.

The computing device 100 may be configured to detect a subject lower boundary curve 107 in the image 108. In some embodiments, the subject lower boundary curve 107 is defined along the base of the upper eye lid of the subject 101 visible in the image 108 between the medial subject eye landmark 106*a* and the lateral subject eye landmark 106*b*.

The computing device 100 may be configured to map the design lower boundary curve 109 to the subject lower boundary curve 107, defining the area where the micro-robot 110 may be directed to apply an eyelash extension according to the lash extension design 102. This may further include matching subject eye landmarks 106*a*, 106*b* and design eye landmarks 103*a*, 103*b*. In some embodiments, the subject eye landmarks 106*a*, 106*b* define the medial and lateral limits of the lash extension design 102 as applied to the subject 101, where the design 102 and lashes are only applied between the identified landmarks 106*a*, 106*b*. This may further include adjusting the design upper boundary curve 111 based on the mapping of the design lower boundary curve 109 to the subject lower boundary curve 107.

The computing device may be configured to determine the lash extension distribution curve 104. In some embodiments, a distance between the design upper boundary curve 111 and the design lower boundary curve 109 defines the lash extension distribution curve 104 for any given point along the design lower boundary curve 409*a*. In such embodiments, the lash extension distribution curve 104 further defines which defines lash extension lengths at points along the design lower boundary curve 109.

Finally, the computing device 100 may be configured to transmit the lash extension distribution curve 104 to one or more micro-robots 110. In some embodiments, this transmission is accomplished through one or more wired communication technologies (including but not limited to Ethernet, FireWire, and USB), one or more wireless communication technologies (including but not limited to Wi-Fi, WiMAX, Bluetooth, 2G, 3G, 4G, 5G, and LTE), and/or combinations thereof. In some embodiments, this causes a micro-robot 110 to apply at least one eyelash to the subject 101 according to the lash extension lengths defined by the lash extension distribution curve 104.

Figure 2A:
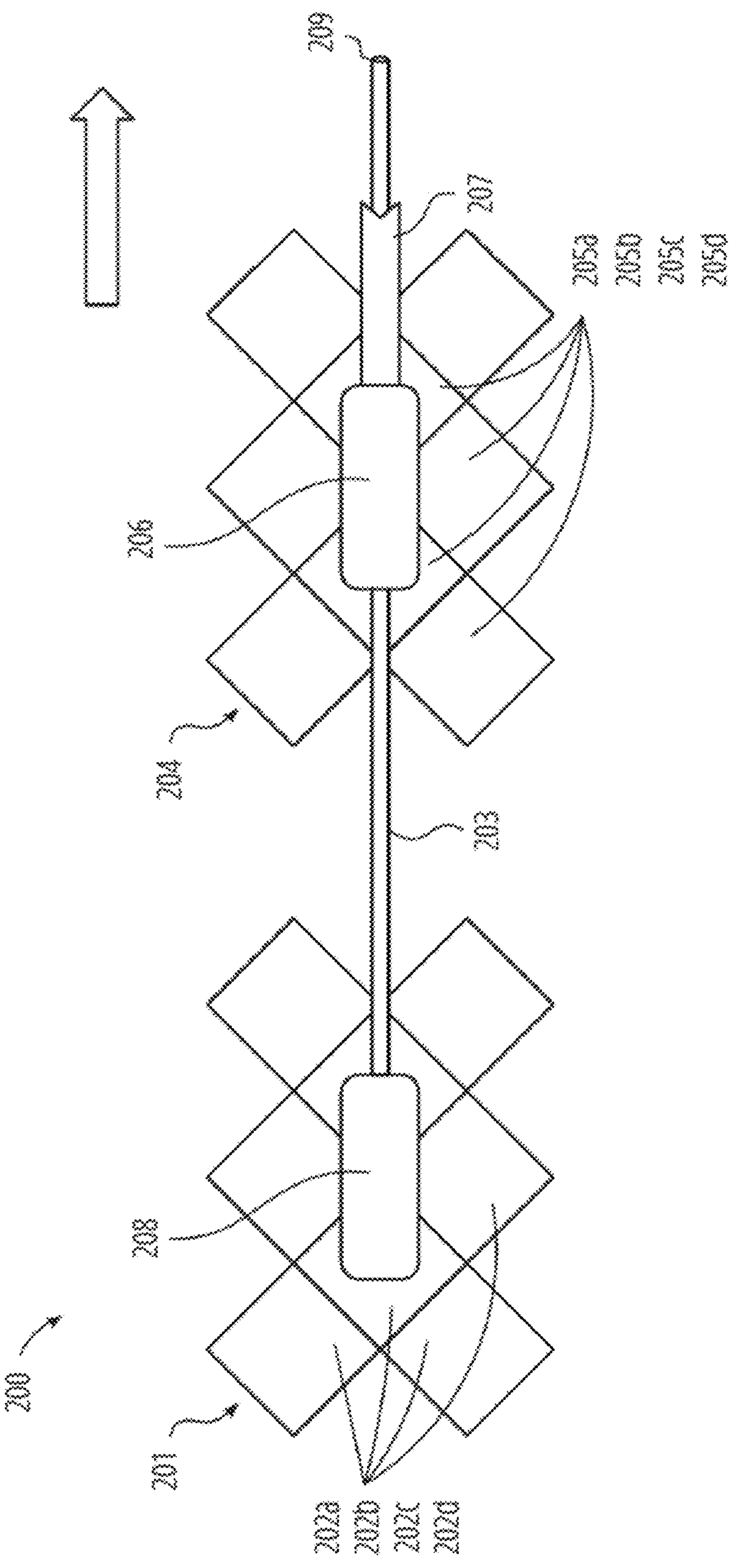
FIG. 2A, FIG. 2B, FIG. 3A, and FIG. 3B illustrate aspects of a non-limiting example of an eyelash extension creation system according to various aspects of the present disclosure.
Figure 2B:
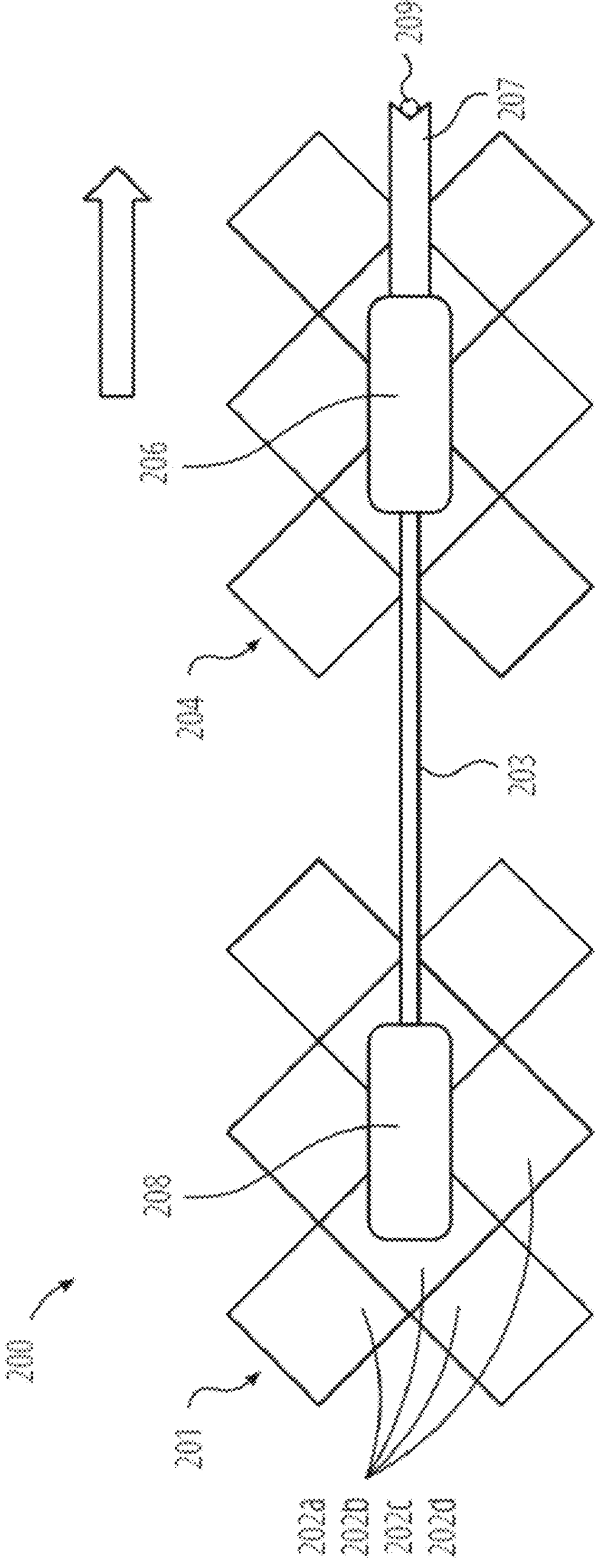
Figure 3A:
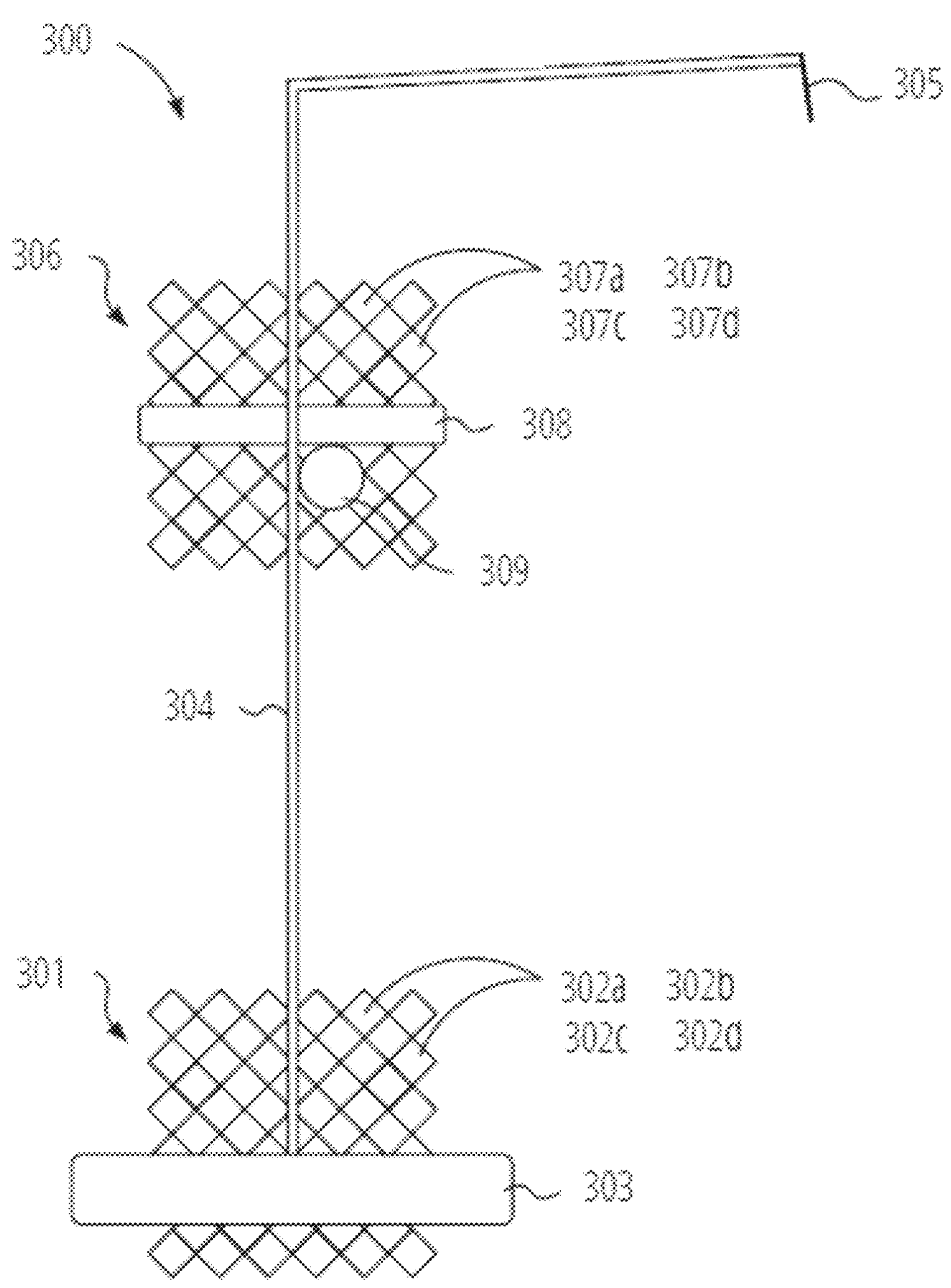
Figure 3B:
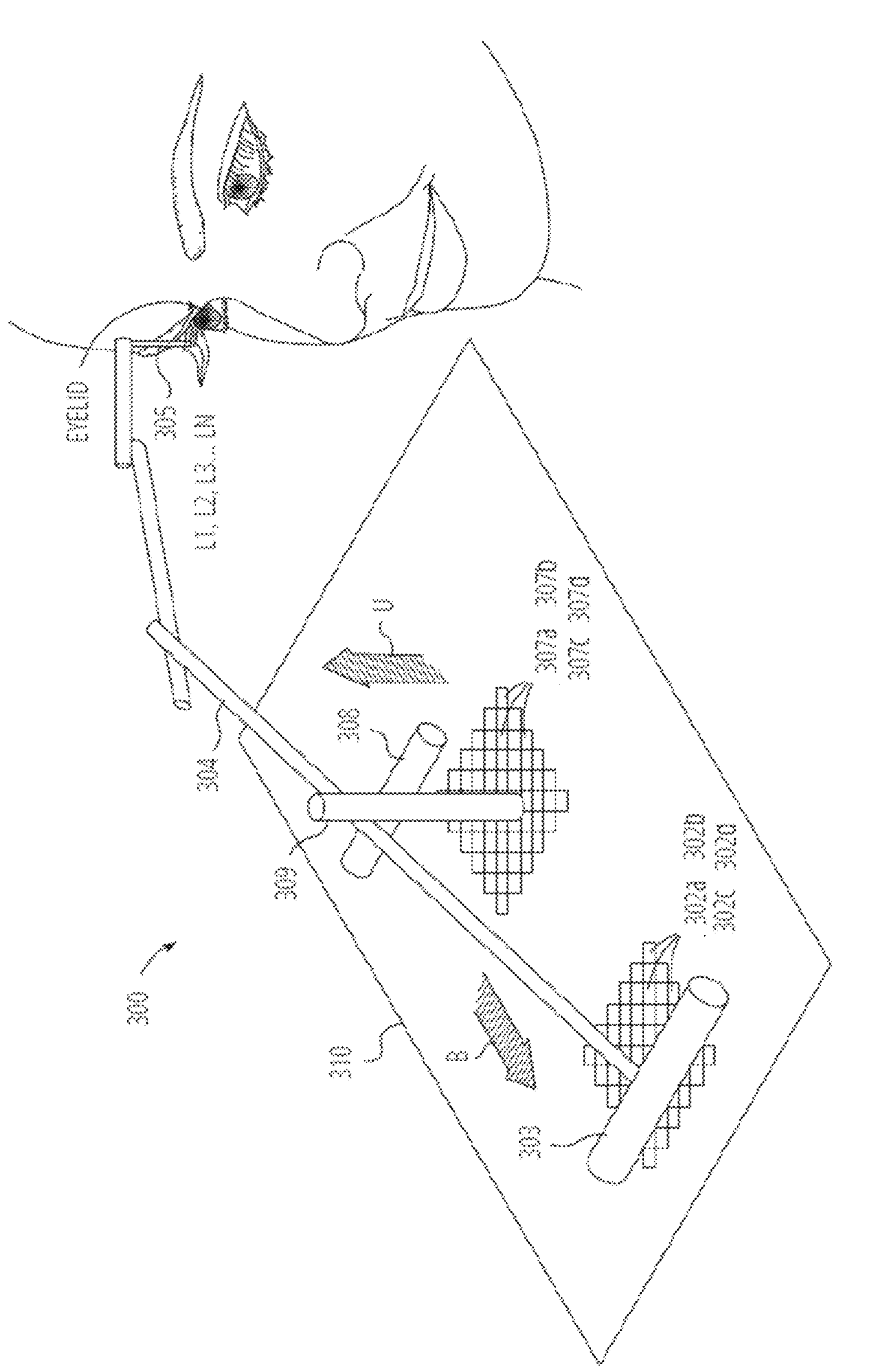

FIG. 2A, FIG. 2B, FIG. 3A, and FIG. 3B illustrate aspects of a non-limiting example of an eyelash extension creation system according to various aspects of the present disclosure. FIG. 2A and FIG. 2B illustrate a non-limiting example embodiment of a micro-robot gripping system, while FIG. 3A and FIG. 3B illustrate a non-limiting example embodiment of a micro-robot crane system. To create and apply an eyelash extension, the eyelash extension creation system receives instructions that indicate a length, curve, and location of one or more new lashes to be applied to the subject 101 for the eyelash extension. For each of the one or more lashes, the micro-robot crane system separates the existing lashes of the subject that flank the desired location for the new lash, and the micro-robot gripping system applies the new lash in the desired location.

In FIG. 2A and FIG. 2B, the micro-robot gripping system 200 includes a first micro-robot 201 having a first plurality of magnets 202*a*, 202*b*, 202*c*, . . . 202*d* and a wire comb 203, and a second micro-robot 204 having a second plurality of magnets 205*a*, 205*b*, 205*c*, . . . 205*d*, a tube 206, and a gripper 207.

In some embodiments, the first micro-robot 201 includes a first plurality of magnets 202*a*, 202*b*, 202*c* . . . 202*d*. In some embodiments, the first plurality of magnets 202*a*, 202*b*, 202*c*, . . . 202*d* is arranged in an array of alternating magnetization, as explained herein. In some embodiments, the first plurality of magnets 202*a*, 202*b*, 202*c*, . . . 202*d* is a plurality of NdFeB magnets.

In some embodiments, the first micro-robot 201 also includes a holder 208 configured to retain the wire comb 203. In some embodiments, the wire comb 203 is configured to slide into the holder 208. In some embodiments, the wire comb 203 is integrated into the holder 208.

The wire comb 203 may be made of metal, ceramic, carbon, plastic, or a combination thereof. In some embodiments, the wire comb 203 includes an attachment end 209. The attachment end 209 may be disposed at substantially a 45-degree angle from the wire comb 203 to form a "hook" shape.

In some embodiments, the second micro-robot 204 includes a second plurality of magnets 205*a*, 205*b*, 205*c* . . . 205*d*. In some embodiments, the second plurality of magnets 205*a*, 205*b*, 205*c* . . . 205*d* is arranged in an array of alternating magnetization, as explained herein. In some embodiments, the second plurality of magnets 205*a*, 205*b*, 205*c* . . . 205*d* is a plurality of NdFeB magnets.

In some embodiments, the second micro-robot 204 further includes a tube 206. The tube 206 is configured to slide along the wire comb 203 of the first micro-robot 201. In this manner, the second micro-robot 204 may move back and forth (such as in the direction of the arrow in FIG. 2A) along the wire comb 203.

In some embodiments, the second micro-robot 204 further comprises a gripper 207. In some embodiments, the gripper 207 is configured to mate with the attachment end 209 of the wire comb 203. In some embodiments, the gripper 207 has a "V-shaped" end.

In operation, the first micro-robot 201 is secured to a first location. In some embodiments, the first location is on a substrate. The second micro-robot 204 may then be slid along the wire comb 203 through the tube 206 of the second micro-robot 204. In some embodiments, the second micro-robot 204 slides towards the attachment end 209 of the wire comb 203, as shown in FIG. 2A and FIG. 2B, such that the gripper 207 contacts the attachment end 209. In some embodiments, an eyelash or cluster of eyelashes (not pictured in FIG. 2A-FIG. 2B) is gripped between the gripper 207 and the attachment end 209. The first micro-robot 201 and/or the second micro-robot 204 may then be positioned to apply the eyelash or cluster of eyelashes to an eyelid. In some embodiments, the first micro-robot 201 and the second micro-robot 204 are configured to move together, such that the distance between the first micro-robot 201 and the second micro-robot 204 does not change. Once the micro-robots 201, 204 are in position, the gripper 207 may be retracted away from the attachment end 209, such as by moving the second micro-robot 204 along the wire comb 203 in the opposite direction. Then, the eyelash or eyelash cluster is applied to the eyelid. In some embodiments, the eyelash or eyelash cluster may include an adhesive, such as eyelash glue. In some embodiments, a subject 101 may apply adhesive, magnetic eyeliner, or the like to their eyes before using system 200. In some embodiments, the second micro-robot 204 may remain in place for a set period of time (such as 60 seconds) before retracting along the wire comb 203 to ensure the eyelash or cluster of eyelashes remain in place, prior to releasing the eyelash or cluster of eyelashes.

In some embodiments, throughout this operation, the first micro-robot 201 and/or the second micro-robot 204 may slide across a substrate. In other embodiments, the first micro-robot 201 and/or the second micro-robot 204 may levitate across a substrate. In some embodiments, the first micro-robot 201 and the second micro-robot 204 are configured to slide across or levitate over a flexible substrate.

In FIG. 3A-FIG. 3B, the illustrated non-limiting example embodiment of the micro-robot crane system 300 includes a single micro-robot crane. The micro-robot crane system 300 may include a back micro-robot 301 having a first plurality of magnets 302*a*, 302*b*, 302*c* . . . 302*d*, a rotary bearing 303, and a separation arm 304 including a separator tip 305. In some embodiments, the micro-robot crane system 300 further includes a front micro-robot 306 having a second plurality of magnets 307*a*, 307*b*, 307*c* . . . 307*d*, a mount 308, and mechanical stop 309.

In some embodiments, the back micro-robot 301 includes a first plurality of magnets 302*a*, 302*b*, 302*c* . . . 302*d*. In some embodiments, the first plurality of magnets 302*a*, 302*b*, 302*c* . . . 302*d* is arranged in an array of alternating magnetization. In some embodiments, the first plurality of magnets 302*a*, 302*b*, 302*c* . . . 302*d* is a plurality of NdFeB magnets.

In some embodiments, the back micro-robot 301 further includes a rotary bearing 303. The rotary bearing 303 is configured to retain the separation arm 304, and allow the separation arm 304 to move up and down over the mount 308 of the front micro-robot 306, as shown in FIG. 3B.

In some embodiments, the separation arm 304 includes a separator tip 305 configured to contact a lash line and separate one or more lashes from one another, as shown in FIG. 3B. In some embodiments, the separator tip 305 is disposed at an angle from the separation arm 304.

In some embodiments, the front micro-robot 306 includes a second plurality of magnets 307*a*, 307*b*, 307*c* . . . 307*d*. In some embodiments, the second plurality of magnets 307*a*, 307*b*, 307*c* . . . 307*d* is arranged in an array of alternating magnetization. In some embodiments, the second plurality of magnets 307*a*, 307*b*, 307*c* . . . 307*d* is a plurality of NdFeB magnets.

The front micro-robot 306 may further include a mount 308 configured to slide along the separation arm 304. The mount 308 is configured to hold the separation arm 304 and slide backwards and forwards along the separation arm 304 to raise and lower the separation arm 304, as shown in FIG. 3B.

In some embodiments, the front micro-robot 306 further includes a mechanical stop 309, which further retains the separation arm 304. The mechanical stop 309 may prevent the separation arm from disengaging from or falling from the mount 308.

In operation, the back micro-robot 301 may remain stationary. The front micro-robot 306 may move backwards, in direction B. As the front micro-robot 306 moves in direction B, the separation arm 304 is raised upwards with the rotary bearing in the direction U. Because the separation arm 304 contacts mount 308, as the front micro-robot 306 moves backwards, the mount 308 increases an angle between the substrate 310 and the separation arm 304. In this manner, the separator tip 305 can contact a lash line of an eyelid, as shown in FIG. 3B. The separator tip 305 may fit between individual lashes of a plurality of lashes L1, L2, L3 . . . LN.

In some embodiments, after contacting the lash line with the separator tip 305, the back micro-robot 301 and the front micro-robot 306 may move together in a direction perpendicular to direction B to separate adjacent eyelashes.

In some embodiments, throughout this operation, the back micro-robot 301 and/or the front micro-robot 306 may slide across a substrate 310. In other embodiments, the back micro-robot 301 and/or the front micro-robot 306 may levitate across a substrate 310. In some embodiments, the back micro-robot 301 and the front micro-robot 306 are configured to slide across or levitate over a flexible substrate.

Further details regarding an eyelash extension creation system that includes the micro-robot gripping system and the micro-robot crane system illustrated in FIG. 2A, FIG. 2B, FIG. 3A, and FIG. 3B are provided in commonly owned, co-pending U.S. application Ser. No. 18/649,034, filed Apr. 29, 2024, the entire disclosure of which is hereby incorporated by reference herein for all purposes.

Figure 4A:
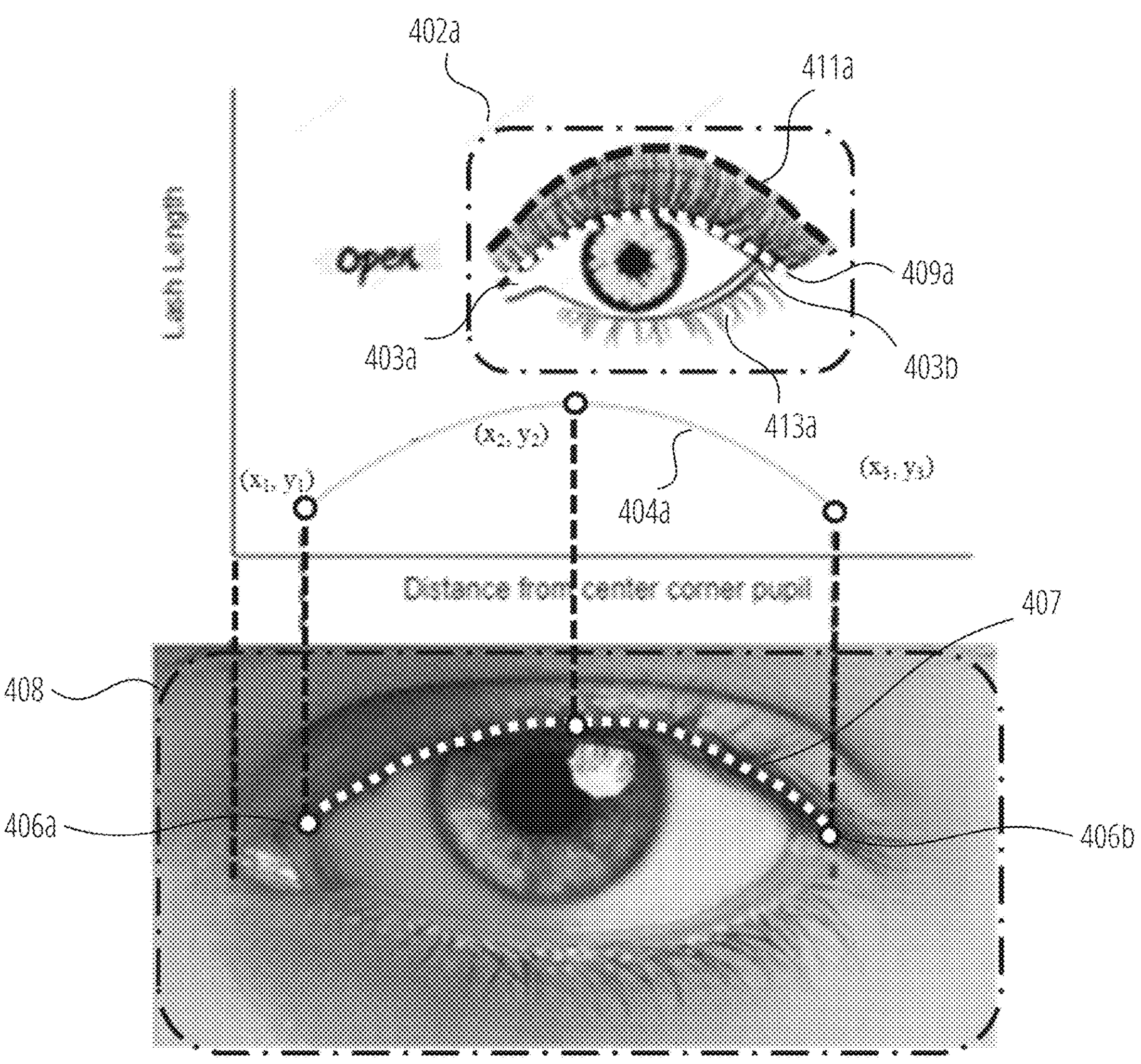
FIG. 4A, FIG. 4B, and FIG. 4C are aspects of a non-limiting example of a lash extension design based on a lash extension design image and the resulting lash extension distribution curve.
Figures 4B, 4C:
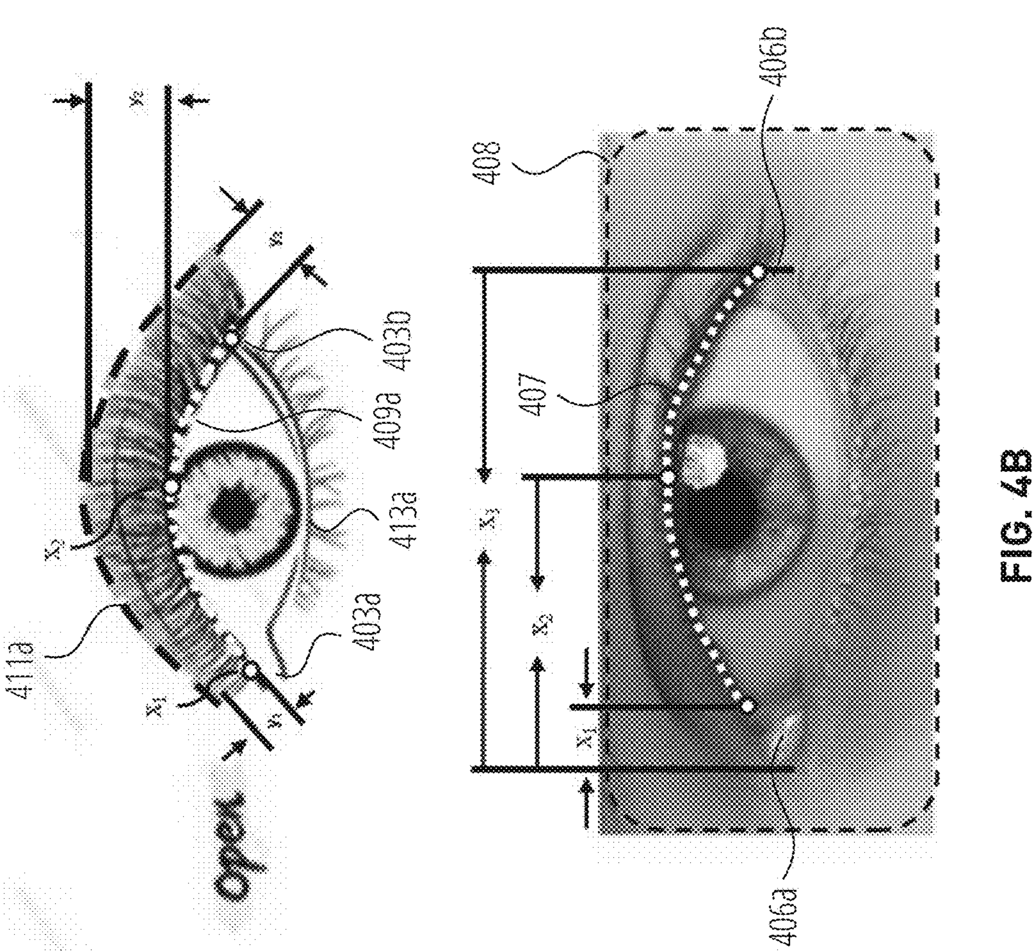
Figure 4D:
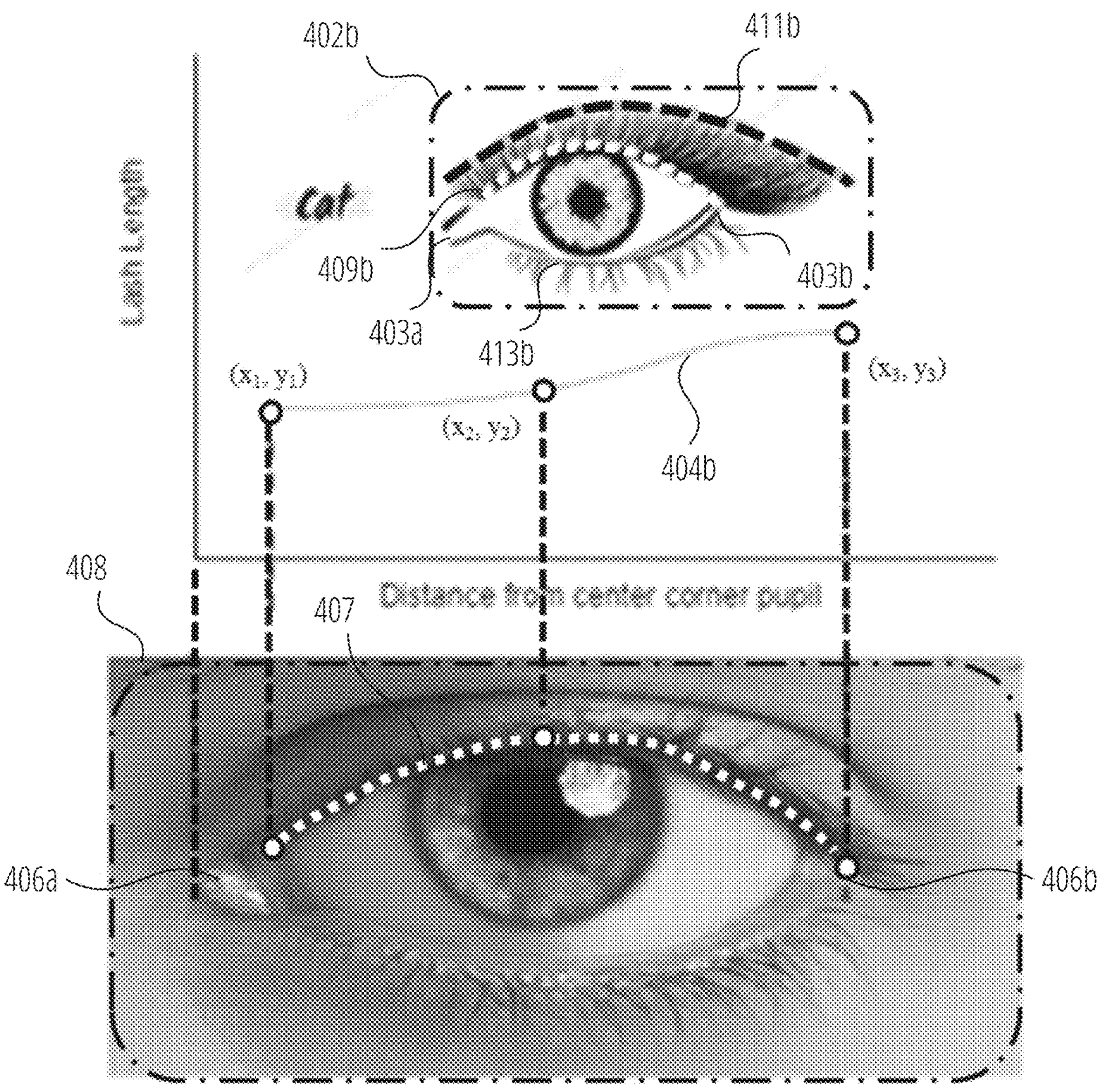
FIG. 4D and FIG. 4E illustrate additional non-limiting examples of lash extension designs based on their respective lash extension design images, as well as their resulting lash extension distribution curves.
Figure 4E:
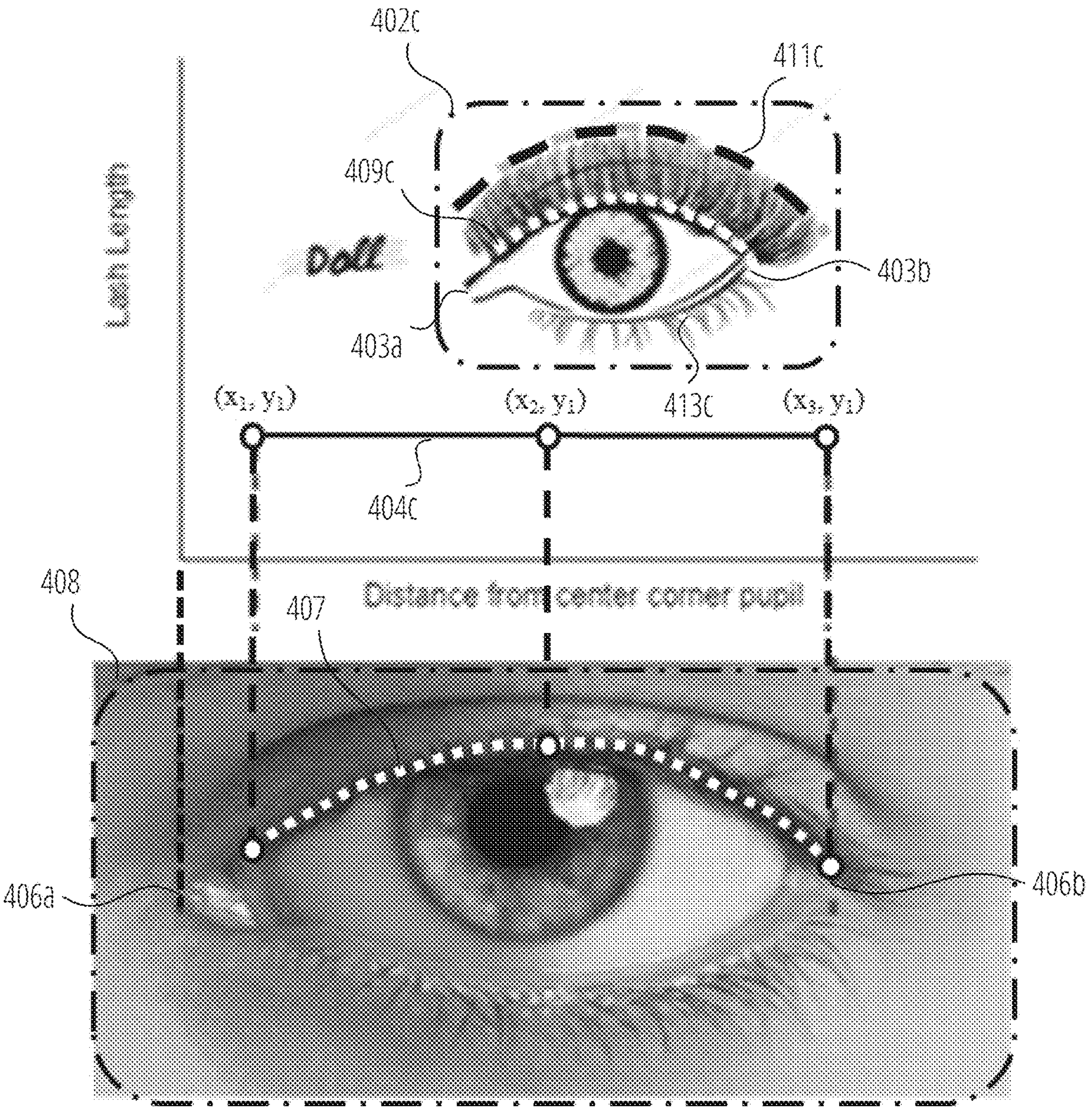

FIG. 4A, FIG. 4B, and FIG. 4C are aspects of a non-limiting example of a lash extension design 402*a* based on lash extension design image 413*a* and the resulting lash extension distribution curve 404*a*. FIG. 4D and FIG. 4E illustrate additional non-limiting examples of lash extension designs 402*b*, 402*c* based on their respective lash extension design images 413*b*, 413*c* and the resulting lash extension distribution curves 404*b*, 404*c*. It will be appreciated that the illustrations depict non-limiting examples of actions that may be performed by the computing device 100 in system 1000, as depicted in FIG. 1 and described above.

The lash extension design image 413*a* may include a two-dimensional rendering of an eyelash design, capturing the "look" of a particular design in relation to an exemplary eye. Non-limiting examples of a lash extension design image 413*a* may include an "Open" lash extension design image 413*a* (illustrated in FIG. 1 and FIG. 4A), a "Cat" lash extension design image 413*b* (illustrated in FIG. 4D), or a "Doll" lash extension design image 413*c* (illustrated in FIG. 4E). While illustrative embodiments are illustrated and described, it will be appreciated that myriad changes can be made to the lash extension design image 113 without departing from the spirit and scope of the invention.

FIG. 4A illustrates an "Open" lash extension design 402*a* (based on lash extension design image 413*a*), which includes longer lashes in the middle of the design 402*a* and shorter lashes towards the medial and lateral design eye landmarks 406*a*, 406*b*.

As discussed above, the computing device 100 may be configured to generate a lash extension design 402*a* based upon the analysis of a lash extension design image 413*a*. In such embodiments, the computing device 100 may receive the lash extension design image 413*a* and identify 403*a*, 403*b* in the lash extension design image 402*a*. In some embodiments, this includes identifying at least one medial design eye landmark 403*a* and at least one lateral design eye landmark 403*b*. In some embodiments, the identified medial design eye landmark 403*a* may include a caruncle, a medial canthus, or a start of a subject lash.

In some embodiments, the identified lateral design eye landmark 403*b* may include a lateral canthus. The computing device 100 may detect a design lower boundary curve 409*a* in the lash extension design image 413*a*. In some embodiments, the design lower boundary curve 409*a* is defined along the base of the upper eye lid of the lash extension design image 413*a* between the medial design eye landmark 403*a* and the lateral design eye landmark 403*b*, such that the curve follows the lower limit (attached "ends") of the individual lashes of the lash extension design image 413*a*.

The computing device 100 may also detect a design upper boundary curve 411*a* in the lash extension design image 413*a*. In some embodiments, the design upper boundary curve 411*a* is defined such that the curve follows the upper limit (unattached "ends") of the individual lashes of the lash extension design image 413*a*. In some embodiments, the design upper boundary curve 411*a* includes separate value lengths for every point of the design lower boundary curve 409*a*, such that each individual lash of the lash extension design image 113 is associated with its own length value. In some embodiments, the design upper boundary curve 111 includes length values for segments of the design lower boundary curve, such that individual lashes of the lash extension design image 113 within a given segment are assigned the same length value.

In some embodiments, the lash extension design 402*a* is generated by another device, and the lash extension design 402*a* is transferred to the computing device 100. The transferred lash extension design 402*a* may include one or more of the following: design eye landmarks 403*a*, 403*b*, the design lower boundary curve 409*a*, and the design upper boundary curve 411*a*.

The image sensor 105 may capture an image 408 of the eye of a subject 101 and transmit the image 408 to the computing device 100. The computing device 100 may identify one or more subject eye landmarks 406*a*, 406*b* in the image 408. In some embodiments, this includes identifying at least one medial subject eye landmark 406*a* and at least one lateral subject eye landmark 406*b*. In some embodiments, the identified medial subject eye landmark 406*a* may include a caruncle, a medial canthus, or a start of a subject lash. In some embodiments, the identified lateral subject eye landmark 406*b* may include a lateral canthus. In the illustrated example; the start of the subject's lash 406*a* (located at $x=x_1$) and the lateral canthus 406*b* (located at $x=x_3$) are identified by the computing device 100, where the center corner pupil (defined in this instance as the medial-most point of the caruncle) is located at $x=0$.

The computing device 100 may detect a subject lower boundary curve 407 in the image 408. In some embodiments, the subject lower boundary curve 407 is defined along the base of the upper eye lid of the subject 101 visible in the image 408 between the medial subject eye landmark 406*a* and the lateral subject eye landmark 406*b* (from $x=x_1$ to $x=x_3$).

The computing device 100 may map the design lower boundary curve 409*a* to the subject lower boundary curve 407, defining the area where the micro-robot 110 may be directed to apply an eyelash extension according to the lash extension design 402*a*. This may further include matching medial subject eye landmarks 406*a*, 406*b* and medial design eye landmarks 403*a*, 403*b*. In some embodiments, the medial subject eye landmarks 406*a*, 406*b* define the medial and lateral limits of the lash extension design 402*a* as applied to the subject 101, where the lashes are only applied between the identified subject eye landmarks 406*a*, 406*b*. This may further include adjusting the design upper boundary curve 411*a* based on the mapping of the design lower boundary curve 409*a* to the subject lower boundary curve 407.

The computing device 100 may determine the lash extension distribution curve 404*a*. In some embodiments, a distance between the design upper boundary curve 411*a* and the design lower boundary curve 409*a* defines the lash extension distribution curve 404*a*. In such embodiments, the lash extension distribution curve 404*a* further defines which defines lash extension lengths at points along the design lower boundary curve 409*a*. In the illustrated example, the lash extension length at medial design eye landmark 403*a* is equal to $y_1$ and the lash extension length at lateral design eye landmark 403*b* is equal to $y_2$. This relationship is depicted in greater detail in FIG. 4B and FIG. 4C.

FIG. 4B and FIG. 4C illustrate the process by which the computing device 100 may produce the lash extension distribution curve 404*a* using the lash extension design 402*a* and the image 408 of the eye of the subject 101.

Referring to FIG. 4B, the computing device 100 may determine the lash extension length for each point on the design lower boundary curve 409*a* of the lash extension design 402*a* between the medial design eye landmark 403*a* and the lateral design eye landmark 403*b*. In some embodiments, the lash extension length is equal to the distance between the design upper boundary curve 411*a* and the design lower boundary curve 409*a* for any given point along the design lower boundary curve 409*a*. In the illustrated example, the lash extension length at medial design eye landmark 403*a* ($x_1$) is equal to $y_1$; at a second point ($x_2$) along the design lower boundary curve 409*a*—near the center of the eye approximately halfway between the medial and lateral design eye landmarks 403*a*, 403*b*—the lash length is equal to $y_2$; and the lash extension length at lateral design eye landmark 403*b* ($x_3$) is equal to $y_2$.

Referring to FIG. 4C, the computing device may determine a lash extension distribution curve 404*a*, defined between the medial subject eye landmarks 406*a* and the lateral subject eye landmark 406*b*.

In some embodiments, the lash extension length at each point along the design lower boundary curve 409*a* defines the lash extension distribution curve 404*a*, where the lash extension length is equal to the difference between the design upper boundary curve 411*a* and the design lower boundary curve 409*a* for any given point along the design lower boundary curve 409*a*. In the illustrated embodiment, the lash extension distribution curve 404*a* is defined from $x_1$ to $x_3$, where the center corner pupil (defined in this instance as the medial-most point of the caruncle) is located at x=0. In the illustrated example, $x_2$ is an approximate halfway point between the two. As depicted by lash extension distribution curve 404*a*, at $x_1$, the lash length is equal to $y_1$; at $x_2$, the lash length is equal to $y_2$; and at $x_3$, the lash length is equal to $y_3$.

FIG. 4D illustrates a "Cat" lash extension design 402*b* (based on lash extension design image 413*b*), which includes shorter lashes near the medial design eye landmark 403*a* of the eye and increasingly longer lashes moving toward the lateral design eye landmark 403*b*. The processes by which (1) the design eye landmarks 403*a*, 403*b* and subject eye landmarks 406*a*, 406*b* are identified; (2) the design upper boundary curve 411*b* and design lower boundary curve 409*b* are detected in the lash extension design image 413*b*; (3) the design lower boundary curve 409*b* is detected; (4) the lash extension design 402*b* is mapped using the image 408 of the subject's eye; and (5) the lash extension distribution curve 404*b* is determined are all the same as described in FIG. 4A, FIG. 4B, and FIG. 4C. It will be appreciated that, because the "Cat" design has different features than the "Open" design of the preceding figures, the resulting lash extension distribution curve 404*b* is different than example in FIG. 4A and FIG. 4C, with a greater lash extension length at the lateral canthus (x3, y3).

Finally, FIG. 4E illustrates a "Doll" lash extension design 402*c* (based on lash extension design image 413*c*), which includes lashes of uniform length between the medial and lateral design eye landmarks 403*a*, 403*b*. The processes by which (1) the design eye landmarks 403*a*, 403*b* and subject eye landmarks 406*a*, 406*b* are identified; (2) the design upper boundary curve 411*c* and design lower boundary curve 409*c* are detected in the lash extension design image 413*c*; (3) the design lower boundary curve 409*c* is detected; (4) the lash extension design 402*c* is mapped using the image 408 of the subject's eye; and (5) the lash extension distribution curve 404*c* is determined are all the same as described in FIG. 4A, FIG. 4B, and FIG. 4C. It will be appreciated that, because the "Doll" design has different features than the "Open" design of the preceding figures, the resulting lash extension distribution curve 404*c* is different than the example in FIG. 4A and FIG. 4C, with lashes of uniform length (y1) between the medial and lateral design eye landmarks 403*a*, 403*b*.

Figure 5:
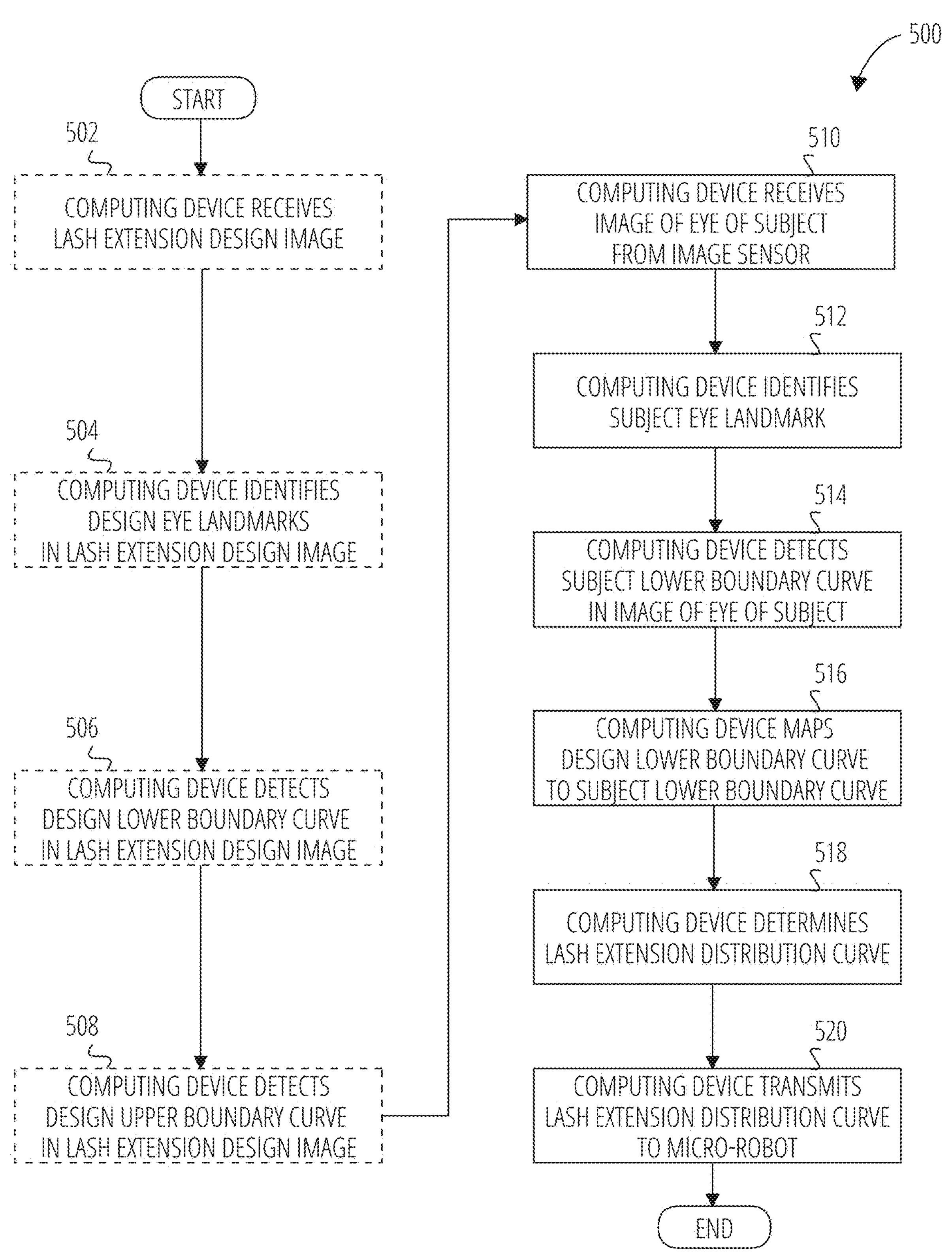
FIG. 5 illustrates a non-limiting example embodiment of a method of controlling a micro-robot to apply an eyelash extension using a lash extension distribution curve according to various aspects of the present disclosure.

FIG. 5 is a flowchart that illustrates a non-limiting example embodiment of a method of controlling a micro-robot to apply an eyelash extension using a lash extension distribution curve according to various aspects of the present disclosure. It should be understood that components identified in method 500 are analogous to components identified in the system 1000 discussed in FIG. 1. In the method 500, a lash extension distribution curve 104 is generated using a system 1000, where a computing device 100 maps a lash extension design 102 to an image 108 of a subject's eye collected by an image sensor 105. The lash extension distribution curve 104 is then transmitted to a micro-robot 110 to assist with applying one or more eyelashes L to the eye of the subject 101.

In some embodiments, the computing device 100 is configured to generate a lash extension design 102 based upon the analysis of a lash extension design image 113. In other embodiments, the lash extension design 102 is generated by another device, and the lash extension design 102 is transferred to the computing device 100.

From a start block, the method 500 proceeds to optional block 502, where the computing device 100 may receive the lash extension design image 113. The lash extension design image 113 may include a two-dimensional rendering of an eyelash design, capturing the "look" of a particular design in relation to an exemplary eye. Non-limiting examples of a lash extension design image 113 may include an "Open" lash extension design image 413*a* (illustrated in FIG. 1 and FIG. 4A), a "Cat" lash extension design image 413*b* (illustrated in FIG. 4D), or a "Doll" lash extension design image 413*c* (illustrated in FIG. 4E). While illustrative embodiments are illustrated and described, it will be appreciated that myriad changes can be made to the lash extension design image 113 without departing from the spirit and scope of the invention.

At optional block 504, the computing device 100 may identify design eye landmarks 103*a*, 103*b* in the lash extension design image 113. In some embodiments, this includes identifying at least one medial design eye landmark 103*a* and at least one lateral design eye landmark 103*b*. In some embodiments, the identified medial design eye landmark 103*a* may include a caruncle, a medial canthus, or a start of a subject lash. In some embodiments, the identified lateral design eye landmark 103*b* may include a lateral canthus.

At optional block 506, the computing device 100 may detect a design lower boundary curve 109 in the lash extension design image 113. In some embodiments, the design lower boundary curve 109 is defined along the base of the upper eye lid of the lash extension design image 113 between the medial design eye landmark 103*a* and the lateral design eye landmark 103*b*, such that the curve follows the lower limit (attached "ends") of the individual lashes of the lash extension design image 113.

At optional block 508, the computing device 100 may detect a design upper boundary curve 111 in the lash extension design image 113. In some embodiments, the design upper boundary curve 111 is defined such that the curve follows the upper limit (unattached "ends") of the individual lashes of the lash extension design image 113. In some embodiments, the design upper boundary curve 111 includes separate value lengths for every point of the design lower boundary curve 109, such that each individual lash of the lash extension design image 113 is associated with its own length value. In some embodiments, the design upper boundary curve 111 includes length values for segments of the design lower boundary curve, such that individual lashes of the lash extension design image 113 within a given segment are assigned the same length value. The resulting lash extension design 102 may include one or more of the following: the design eye landmarks 103*a*, 103*b*, the design lower boundary curve 109, and the design upper boundary curve 111.

At block 510, the computing device 100 may receive the image 108 of the eye of the subject 101 from the image sensor 105.

At block 512, the computing device 100 may identify one or more subject eye landmarks 106*a*, 106*b* in the image 108. In some embodiments, this includes identifying at least one medial subject eye landmark 106*a* and at least one lateral subject eye landmark 106*b*. In some embodiments, the identified medial subject eye landmark 106*a* may include a caruncle, a medial canthus, or a start of a subject lash. In some embodiments, the identified lateral subject eye landmark 106*b* may include a lateral canthus.

At block 514, the computing device 100 may detect a subject lower boundary curve 107 in the image 108. In some embodiments, the subject lower boundary curve 107 is defined along the base of the upper eye lid of the subject 101 visible in the image 108 between the medial subject eye landmark 106*a* and the lateral subject eye landmark 106*b*.

At block 516, the computing device 100 may map the design lower boundary curve 109 to the subject lower boundary curve 107, defining the area where the micro-robot 110 may be directed to apply an eyelash extension according to the lash extension design 102. This may further include matching subject eye landmarks 106*a*, 106*b* and design eye landmarks 103*a*, 103*b*. In some embodiments, the subject eye landmarks 106*a*, 106*b* define the medial and lateral limits of the lash extension design 102 as applied to the subject 101, where the design 102 and lashes are only applied between the identified landmarks 106*a*, 106*b*. This may further include adjusting the design upper boundary curve 111 based on the mapping of the design lower boundary curve 109 to the subject lower boundary curve 107.

At block 518, the computing device 100 may determine the lash extension distribution curve 104. In some embodiments, a distance between the design upper boundary curve 111 and the design lower boundary curve 109 defines the lash extension distribution curve 104 for any given point along the design lower boundary curve 409*a*. In such embodiments, the lash extension distribution curve 104 further defines which defines lash extension lengths at points along the design lower boundary curve 109.

At block 520, the computing device 100 may transmit the lash extension distribution curve 104 to one or more micro-robots 110. In some embodiments, this causes a micro-robot 110 to apply at least one eyelash to the subject 101 according to the lash extension lengths defined by the lash extension distribution curve 104.

The method 500 then proceeds to an end block and terminates.

It should be understood that method 500 should be interpreted as merely representative. In some embodiments, process blocks may be performed simultaneously, sequentially, in a different order, or even omitted, without departing from the scope of this disclosure.

The present application may reference quantities and numbers. Unless specifically stated, such quantities and numbers are not to be considered restrictive, but representative of the possible quantities or numbers associated with the present application. Also, in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 5% of the stated value. For the purposes of the present disclosure, the phrase "at least one of A, B, and C," for example, means (A), (B), (C), (A and B), (A and C), (B and C), or (A, B, and C), including all further possible permutations when greater than three elements are listed.

Embodiments disclosed herein may utilize circuitry in order to implement technologies and methodologies described herein, operatively connect two or more components, generate information, determine operation conditions, control an appliance, device, or method, and/or the like. Circuitry of any type can be used. In an embodiment, circuitry includes, among other things, one or more computing devices such as a processor (e.g., a microprocessor), a central processing unit (CPU), a digital signal processor (DSP), an application-specific integrated circuit (ASIC), a field-programmable gate array (FPGA), or the like, or any combinations thereof, and can include discrete digital or analog circuit elements or electronics, or combinations thereof.

An embodiment includes one or more data stores that, for example, store instructions or data. Non-limiting examples of one or more data stores include volatile memory (e.g., Random Access memory (RAM), Dynamic Random Access memory (DRAM), or the like), non-volatile memory (e.g., Read-Only memory (ROM), Electrically Erasable Programmable Read-Only memory (EEPROM), Compact Disc Read-Only memory (CD-ROM), or the like), persistent memory, or the like. Further non-limiting examples of one or more data stores include Erasable Programmable Read-Only memory (EPROM), flash memory, or the like. The one or more data stores can be connected to, for example, one or more computing devices by one or more instructions, data, or power buses.

In an embodiment, circuitry includes a computer-readable media drive or memory slot configured to accept signal-bearing medium (e.g., computer-readable memory media, computer-readable recording media, or the like). In an embodiment, a program for causing a system to execute any of the disclosed methods can be stored on, for example, a computer-readable recording medium (CRMM), a signal-bearing medium, or the like. Non-limiting examples of signal-bearing media include a recordable type medium such as any form of flash memory, magnetic tape, floppy disk, a hard disk drive, a Compact Disc (CD), a Digital Video Disk (DVD), Blu-Ray Disc, a digital tape, a computer memory, or the like, as well as transmission type medium such as a digital and/or an analog communication medium (e.g., a fiber optic cable, a waveguide, a wired communications link, a wireless communication link (e.g., transmitter, receiver, transceiver, transmission logic, reception logic, etc.). Further non-limiting examples of signal-bearing media include, but are not limited to, DVD-ROM, DVD-RAM, DVD+RW, DVD-RW, DVD-R, DVD+R, CD-ROM, Super Audio CD, CD R, CD+R, CD+RW, CD-RW, Video Compact Discs, Super Video Discs, flash memory, magnetic tape, magneto-optic disk, MINIDISC, non-volatile memory card, EEPROM, optical disk, optical storage, RAM, ROM, system memory, web server, or the like.

The detailed description set forth above in connection with the appended drawings, where like numerals reference like elements, are intended as a description of various embodiments of the present disclosure and are not intended to represent the only embodiments. Each embodiment described in this disclosure is provided merely as an example or illustration and should not be construed as preferred or advantageous over other embodiments. The illustrative examples provided herein are not intended to be exhaustive or to limit the disclosure to the precise forms disclosed. Similarly, any steps described herein may be interchangeable with other steps, or combinations of steps, in order to achieve the same or substantially similar result. Generally, the embodiments disclosed herein are non-limiting, and the inventors contemplate that other embodiments within the scope of this disclosure may include structures and functionalities from more than one specific embodiment shown in the figures and described in the specification.

In the foregoing description, specific details are set forth to provide a thorough understanding of exemplary embodiments of the present disclosure. It will be apparent to one skilled in the art, however, that the embodiments disclosed herein may be practiced without embodying all the specific details. In some instances, well-known process steps have not been described in detail in order not to unnecessarily obscure various aspects of the present disclosure. Further, it will be appreciated that embodiments of the present disclosure may employ any combination of features described herein.

The present application may include references to directions, such as "vertical," "horizontal," "front," "rear," "left," "right," "top," and "bottom," etc. These references, and other similar references in the present application, are intended to assist in helping describe and understand the particular embodiment (such as when the embodiment is positioned for use) and are not intended to limit the present disclosure to these directions or locations.

The present application may also reference quantities and numbers. Unless specifically stated, such quantities and numbers are not to be considered restrictive, but exemplary of the possible quantities or numbers associated with the present application. Also, in this regard, the present application may use the term "plurality" to reference a quantity or number. In this regard, the term "plurality" is meant to be any number that is more than one, for example, two, three, four, five, etc. The term "about," "approximately," etc., means plus or minus 5% of the stated value. The term "based upon" means "based at least partially upon."

The principles, representative embodiments, and modes of operation of the present disclosure have been described in the foregoing description. However, aspects of the present disclosure, which are intended to be protected, are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure as claimed.

While illustrative embodiments have been illustrated and described, it will be appreciated that various changes can be made therein without departing from the spirit and scope of the invention.

Any incorporation by reference of documents above is limited such that no subject matter is incorporated that is contrary to the explicit disclosure herein. In the event of inconsistent usages between this document and those documents so incorporated by reference, the usage in the incorporated reference(s) should be considered supplementary to that of this document; for irreconcilable inconsistencies, the usage in this document controls. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

What is claimed is:

1. A system for controlling a micro-robot to apply an eyelash extension using a lash extension distribution curve, the system comprising:
- at least one micro-robot, comprising:
  - a plurality of magnets; and
  - an applicator configured to hold at least one eyelash;
- at least one image sensor;
- a computing device that includes at least one processor and a non-transitory computer-readable medium having computer-executable instructions stored thereon that, in response to execution by the at least one processor, cause the computing device to perform actions comprising:
  - receiving an image of an eye of a subject from the at least one image sensor;
  - identifying a plurality of subject eye landmarks in the image;
  - mapping a lash extension design to the image of the eye of the subject using the plurality of subject eye landmarks;
  - determining the lash extension distribution curve based on the mapped lash extension design and
  - transmitting the lash extension distribution curve to the at least one micro-robot.

2. The system of claim 1, wherein identifying the plurality of subject eye landmarks includes:
- identifying a medial subject eye landmark, wherein the medial subject eye landmark is a caruncle, a medial canthus, or a start of a subject lash; and
- identifying a lateral subject eye landmark, wherein the lateral subject eye landmark is a lateral canthus.

3. The system of claim 2, wherein the lash extension design includes a design lower boundary curve; and
- wherein mapping the lash extension design to the image using the plurality of subject eye landmarks includes:
  - detecting a subject lower boundary curve along a base of an upper eye lid visible in the image between the medial subject eye landmark and the lateral subject eye landmark; and
  - mapping the design lower boundary curve to the subject lower boundary curve.

4. The system of claim 3, wherein the lash extension design includes a design upper boundary curve; and
- wherein mapping the design lower boundary curve to the subject lower boundary curve includes adjusting the design upper boundary curve based on the mapping of the design lower boundary curve to the subject lower boundary curve.

5. The system of claim 4, wherein a distance between the design lower boundary curve and the design upper boundary curve defines the lash extension distribution curve;

wherein the lash extension distribution curve defines lash extension lengths along the design lower boundary curve; and wherein transmitting the lash extension distribution curve to the micro-robot causes the micro-robot to apply at least one eyelash to the subject according to the lash extension lengths.

6. The system of claim 4, wherein the design upper boundary curve includes length values for points along the design lower boundary curve or length values for segments along the design lower boundary curve.

7. The system of claim 1, wherein the computing device is further configured to perform actions comprising:

receiving a lash extension design image;

identifying a medial design eye landmark and a lateral design eye landmark in the lash extension design image;

detecting a design lower boundary curve in the lash extension design image between the medial design eye landmark and the lateral design eye landmark; and detecting a design upper boundary curve in the lash extension design image.

8. A method of controlling a micro-robot to apply an eyelash extension using a lash extension distribution curve, the method comprising:

receiving, by a computing device from an image sensor, an image of an eye of a subject;

identifying, by the computing device, a plurality of subject eye landmarks in the image;

mapping, by the computing device, a lash extension design to the image using the plurality of subject eye landmarks;

determining, by the computing device, the lash extension distribution curve based on the mapped lash extension design; and transmitting, by the computing device, the lash extension distribution curve to the micro-robot.

9. The method of claim 8, wherein identifying the plurality of subject eye landmarks includes:

identifying a medial subject eye landmark, wherein the medial subject eye landmark is a caruncle, a medial canthus, or a start of a subject lash; and identifying a lateral subject eye landmark, wherein the lateral subject eye landmark is a lateral canthus.

10. The method of claim 9, wherein the lash extension design includes a design lower boundary curve; and wherein mapping the lash extension design to the image using the plurality of subject eye landmarks includes:

detecting a subject lower boundary curve along a base of an upper eye lid visible in the image between the medial subject eye landmark and the lateral subject eye landmark; and mapping the design lower boundary curve to the subject lower boundary curve.

11. The method of claim 10, wherein the lash extension design includes a design upper boundary curve; and wherein mapping the design lower boundary curve to the subject lower boundary curve includes adjusting the design upper boundary curve based on the mapping of the design lower boundary curve to the subject lower boundary curve.

12. The method of claim 11, wherein the design upper boundary curve includes length values for points along the design lower boundary curve or length values for segments along the design lower boundary curve.

13. The method of claim 11, wherein a distance between the design lower boundary curve and the design upper boundary curve defines the lash extension distribution curve;

wherein the lash extension distribution curve defines lash extension lengths along the design lower boundary curve; and wherein transmitting the lash extension distribution curve to the micro-robot causes the micro-robot to apply at least one eyelash to the subject according to the lash extension lengths.

14. The method of claim 8, further comprising generating the lash extension design by:

receiving, by the computing device, a lash extension design image;

identifying, by the computing device, a medial design eye landmark and a lateral design eye landmark in the lash extension design image;

detecting, by the computing device, a design lower boundary curve in the lash extension design image between the medial design eye landmark and the lateral design eye landmark; and detecting, by the computing device, a design upper boundary curve in the lash extension design image.

15. A computing device for generating a lash extension distribution curve for use by a micro-robot, the computing device comprising:

circuitry for receiving an image of an eye of a subject from an image sensor;

circuitry for identifying a plurality of subject eye landmarks in the image;

circuitry for mapping a lash extension design to the image using the plurality of subject eye landmarks;

circuitry for determining the lash extension distribution curve based on the mapped lash extension design; and circuitry for transmitting the lash extension distribution curve to at least one micro-robot.

16. The computing device of claim 15, wherein identifying the plurality of subject eye landmarks includes:

identifying a medial subject eye landmark, wherein the medial subject eye landmark is a caruncle, a medial canthus, or a start of a subject lash; and identifying a lateral subject eye landmark, wherein the lateral subject eye landmark is a lateral canthus.

17. The computing device of claim 16, wherein the lash extension design includes a design lower boundary curve; and wherein mapping the lash extension design to the image using the plurality of subject eye landmarks includes:

detecting a subject lower boundary curve along a base of an upper eye lid visible in the image between the medial subject eye landmark and the lateral subject eye landmark; and mapping the design lower boundary curve to the subject lower boundary curve.

18. The computing device of claim 17, wherein the lash extension design includes a design upper boundary curve; and wherein mapping the design lower boundary curve to the subject lower boundary curve includes adjusting the design upper boundary curve based on the mapping of the design lower boundary curve to the subject lower boundary curve.

19. The computing device of claim 18, wherein a distance between the design lower boundary curve and the design upper boundary curve defines the lash extension distribution curve;

wherein the lash extension distribution curve defines lash extension lengths along the design lower boundary curve; and wherein transmitting the lash extension distribution curve to the micro-robot causes the micro-robot to apply at least one eyelash to the subject according to the lash extension lengths.

20. The computing device of claim 15, further comprising:

circuitry for receiving a lash extension design image;

circuitry for identifying a medial design eye landmark and a lateral design eye landmark in the lash extension design image;

circuitry for detecting a design lower boundary curve in the lash extension design image between the medial design eye landmark and the lateral design eye landmark; and circuitry for detecting a design upper boundary curve in the lash extension design image.

* * * * *